Nov. 11, 1958 H. L. SHULDENER 2,859,766
UNIT FOR CHECKING CORROSION, SLIME AND SCALE IN WATER
RE-CIRCULATING INSTALLATIONS
Filed Nov. 22, 1955 2 Sheets-Sheet 1
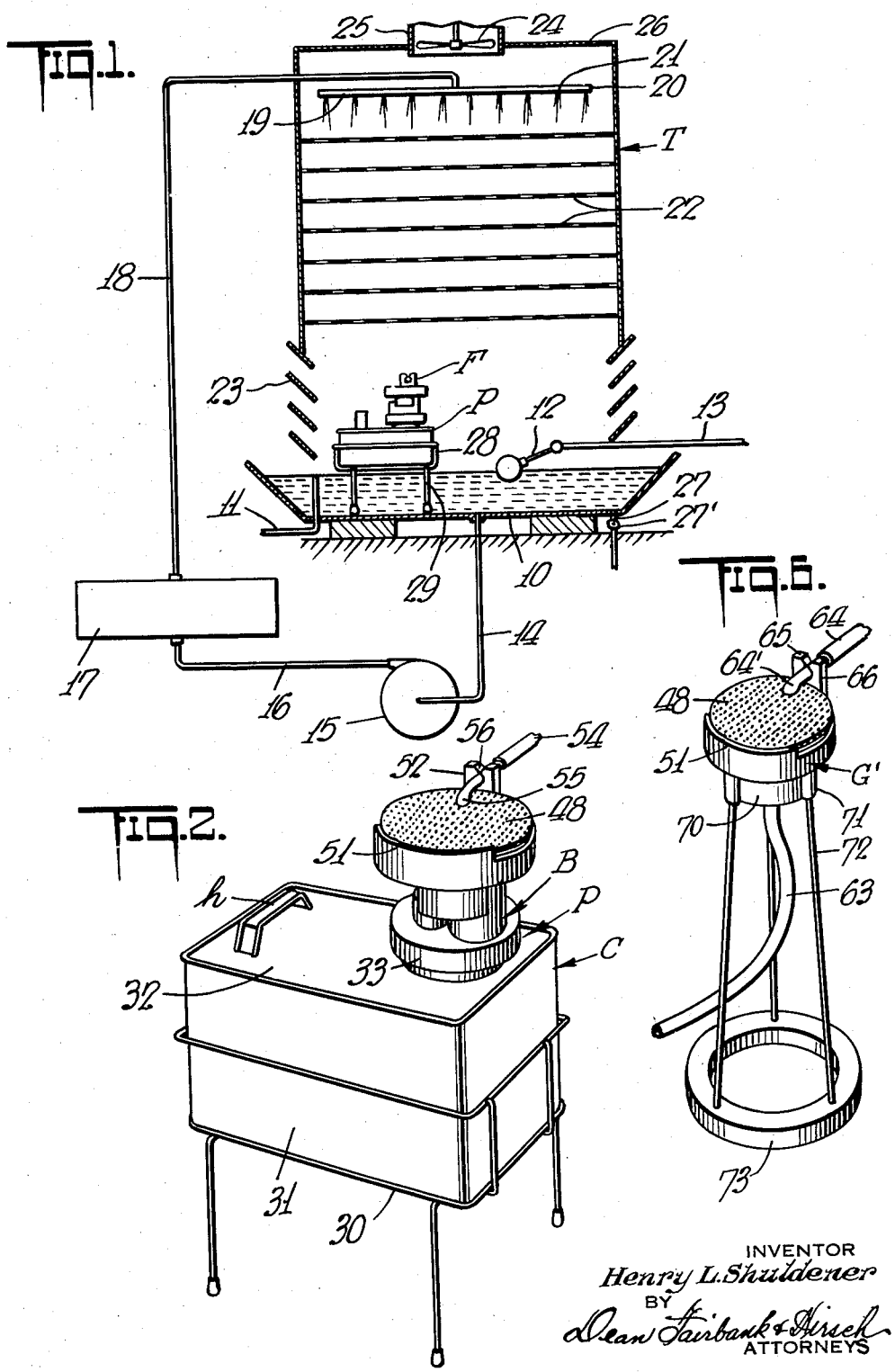
INVENTOR
Henry L. Shuldener
BY
Dean Fairbank & Hirsch
ATTORNEYS Nov. 11, 1958    H. L. SHULDENER    2,859,766
UNIT FOR CHECKING CORROSION, SLIME AND SCALE IN WATER
RE-CIRCULATING INSTALLATIONS
Filed Nov. 22, 1955    2 Sheets-Sheet 2
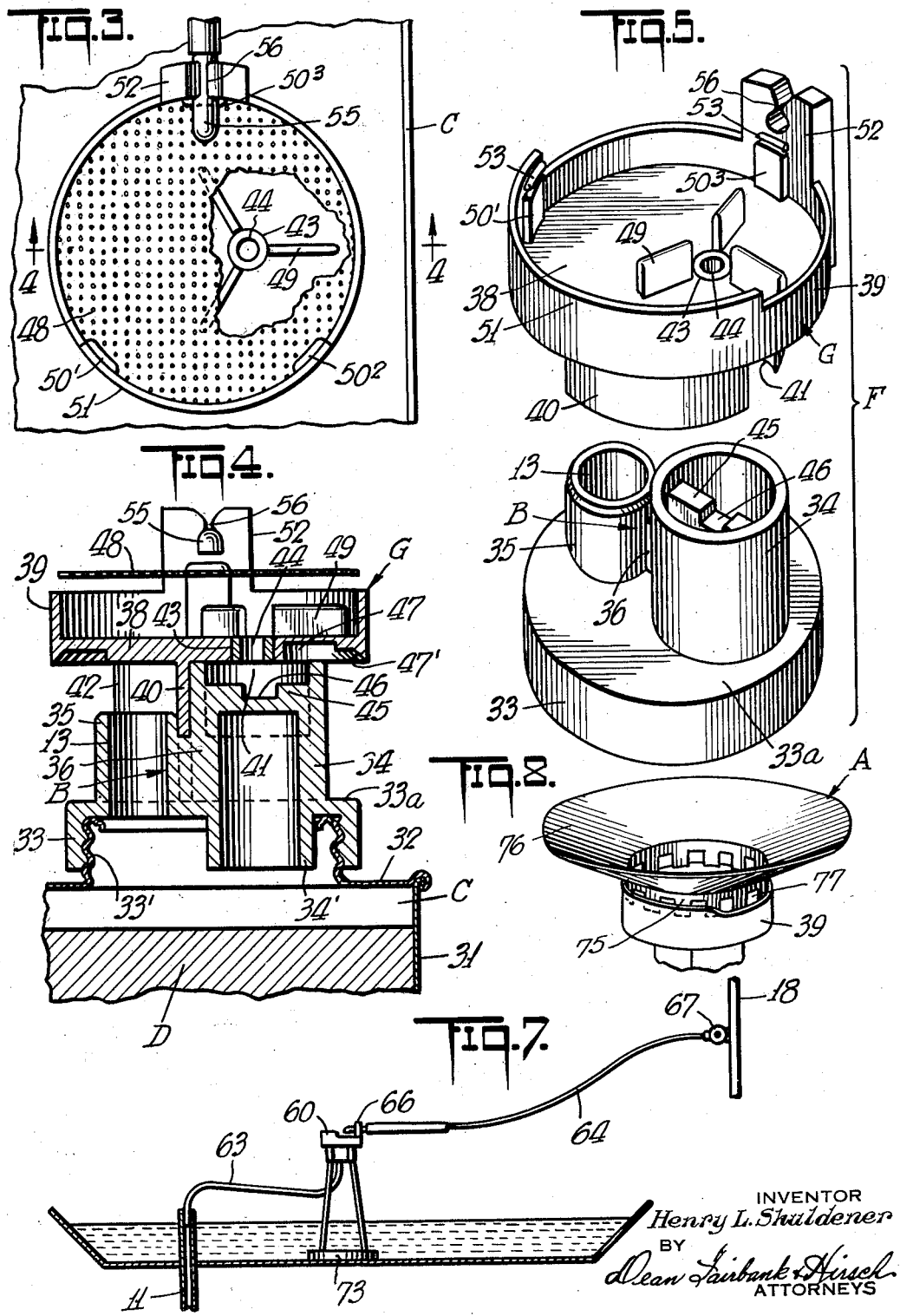
INVENTOR
Henry L. Shuldener
BY
Dean Fairbank & Hirsch
ATTORNEYS

United States Patent Office 2,859,766
Patented Nov. 11, 1958

2,859,766

UNIT FOR CHECKING CORROSION, SLIME, AND SCALE IN WATER RE-CIRCULATING INSTALLATIONS

Henry L. Shuldener, Scarsdale, N. Y., assignor to Water Service Laboratories, Inc., a corporation of New York Application November 22, 1955, Serial No. 548,450

8 Claims. (Cl. 137—268)

The present invention is concerned with systems for re-circulating water, more especially of the type useful in connection with air conditioning systems.

The re-circulating water systems employed in air conditioning operation, bring the water into intimate contact with the air at the spray chambers of cooling towers, evaporative condensers, air washers or the like, so that not only are oxygen and carbon dioxide constantly absorbed from the air during operation to increase the content of these gases that is naturally present in the water supply, but more especially in industrial areas, the water absorbs sulphur dioxide and other acid-forming air borne impurities present in the flue gases discharged from smoke stacks. In many instances the re-circulating water absorbs enough of such acid-forming gases to bring its pH to 6 or even as low as 4 or lower, with corrosive effects that are aggravated by the fact that with lowering of the pH, the oxygen attack also becomes more intense. The air conditioning equipment with which the circulating water comes into engagement is thus subjected to various degrees of attack, depending upon the metals used, especially for those surfaces that do not admit of protection under service conditions by corrosion resistant paints, and more especially is this true of the spray chambers of cooling towers, evaporative condensers, air washers or the like, and interconnecting piping condenser tubes and the various other component metallic parts thereof exposed to water flow in open re-circulating air conditioning systems. The difficulty may be aggravated due to galvanic action between dissimilar metals or at soldered joints used in the assembly.

It is among the objects of the invention to provide simple, compact and inexpensive equipment that serves to protect an otherwise conventional water re-circulating system or installation, by constantly maintaining the water flowing therethrough substantially alkaline and non-corrosive and to maintain on all metal surfaces engaged by the circulating water a corrosion resistant film substantially to insure that the entire system is at all times protected from the chemical effects of corrosion, and furthermore that the valves and spray openings or nozzles of the system are insured against becoming clogged by the accumulation thereat of entrained products of such corrosion, and to accomplish this result without the need for re-construction or even for plumbing connections to the conventional air cooling installation, but wherein a simple chemical feeder unit when merely rested upon the basin of the spray chamber, inherently feeds the chemical at desired predetermined rate at all times during operation of the air conditioning system and not at other times.

Due to escape of chemical from the system with the water lost by windage, pump gland leakage, overflow from the basin and drainage from the re-circulating system, which rate of loss may vary widely, depending on a number of factors, it is another object to provide for ready adjustment in the basic rate at which chemical is fed from the unit into the system, so as sufficiently to compensate for such loss in all cases.

Another object is to provide a portable chemical feeder unit of low cost that serves the above purpose, without the need for needle valves or movable parts, within which unit may be incorporated a molded chemical substantially in the absence of free water for compactness, ease of handling, lightness of weight and dependability of feed rate.

Another object is to provide a chemical feed control unit adapted to be removably mounted upon the conventional container that contains the solid chemical, said feed unit having facilities for feeding water into the chemical container at predetermined volume rate with assurance of a linear rate of flow upon the chemical so slow as to avoid excessive feed of chemical.

Another object is to provide a chemical feeder unit of the above type which admits of control of chemical at rate predetermined at will.

Another object is to provide a simple and compact bleed-off unit for readily withdrawing from the circulating system a desired proportion of water that would in the absence of such withdrawal become overcharged with dissolved mineral matter naturally present in the water, due to evaporation of water therefrom, thus causing precipitation of scale.

Another object is to effect scale control and slime control in systems of the character indicated, individually or conjointly or contemporaneously, to effect either or both scale control and slime control with corrosion control by use of suitable chemicals, all in the same construction and arrangement of feed control used for the corrosion control.

The present application is a continuation-in-part of my copending application Serial No. 298,946, filed July 15, 1952, and abandoned in favor of the present application.

In the accompanying drawings in which are shown one or more of various possible embodiments of the several features of the invention:

Fig. 1 is a diagrammatic view in longitudinal cross-section of an installation that comprises a spray chamber and serves for the air cooling of water in an air conditioning system, said figure showing diagrammatically the position of the portable container of chemical and the feed control unit associated therewith, Fig. 2 is a perspective view on a much larger scale, showing the container of chemical and the associated feed control unit, Fig. 3 is a plan view on a still larger scale of the feed control unit, Fig. 4 is a transverse sectional view of the feed control unit, taken on line 4—4 of Fig. 3, Fig. 5 is a dropped perspective view showing the component body piece and cover piece of the feed control unit, Fig. 6 is a perspective view showing the construction of a bleed-off unit and its mount, Fig. 7 is a side elevation, partly in section, showing the bleed-off unit as installed for use in the basin of the water re-circulating system, and Fig. 8 is a perspective view of a modification to assure adequate supply of water to the tray of the feed control unit.

The spray chamber or tower T shown in one more or less conventional illustrative embodiment, comprises a basin 10 in which a body of water is maintained at substantially constant level by an overflow pipe 11 through the basin, and a float valve 12 that controls the admission of make-up water through pipe 13.

From the bottom of the basin 10, conduit 14 leads to a water circulating pump 15 from which conduit 16 leads to any conventional heat exchanger or condenser 17, from which the heated water is pumped upward by way of conduit 18 to fill horizontal inlet pipe 19 which extends across the top of the tower, is closed at its ends 20 and discharges through spray openings or nozzles 21, the water being divided through a splash distributor or series of horizontal foraminated plates 22 to rain upon the body of water in the basin 10 in a finely divided spray.

Air admitted to the chamber by way of louvres 23 in its side walls is blown upward through the tower, as for instance by means of an induced draft fan 24, encompassed by an upstanding wall 25 rising from a corresponding aperture in the roof 26 of the tower, and cools the circulating water by evaporation of some of the spray within the tower. The usual drain pipe 27 of the spray chamber is normally closed by its valve 27'.

The construction thus far described is one of various possible embodiments of conventional air conditioning systems that comprises a spray chamber and condenser, and with which the invention may be used.

According to the present invention, the chemical feeder for protecting the installation from corrosion due to oxygen, carbon dioxide or other acid dissolved in the circulating water comprises a small portable unit P which may simply be removably rested in the basin 10 of the spray chamber T and performs its function without the need for any plumbing connection or alteration or modification in the conventional air conditioning installation.

Desirably the container C of chemical which is part of unit P, is encompassed by a removable frame such as a wire frame 28 in which it rests. The rubber tipped legs 29 of frame 28 rest in the basin 10 of the spray chamber T. Thus the unit F is preferably wholly above the water in the basin 10 of the spray tower and may readily be removed from frame 28 for replacement.

The metal container (which as above stated is part of portable unit P) is desirably rectangular, having a floor 30, side and end walls 31, and a top wall 32.

Within the container there is housed the required chemical D which extends to a level therein, short of the top wall 32. The feed control unit F for delivering water from the spray tower into and out of the container C for the purpose of dissolving and entraining chemical at the rate to meet requirements may be of metal, glass or plastic, but is preferably of hard rubber of the general consistency of the tread of a rubber tire.

The feed control unit F desirably includes a body member B formed as a cap 33 that fits over the neck 33' of the chemical container C and desirably has a thread conformation fitting the thread on such neck. The body piece B includes an inlet tube 34 rising from the face 33ª of the cap 33, the lower end of the inlet tube desirably also extending downward at 34' from the face of the cap 33. A discharge tube 35 also rises from the face 33ª. If desired, a web 36 integral therewith, connects the walls of the inlet and discharge tubes for rigidity of construction. Both the inlet and the outlet tubes are open at their lower ends for communication with the chemical D within the container C. Desirably the inlet tube is of larger bore in the order of one inch in diameter, and the discharge tube of smaller bore, illustratively ¾ inch in diameter. In the illustrative practical embodiment shown, the inlet tube 34 is of effective length, at least about twice its bore diameter. Illustratively that tube rises 1⅝ inches from the face 33ª of the cap 33 and its overall height is 2⁷⁄₁₆ inches. The discharge tube rises about 1 inch from the face of cap 33 so that its top is about ⅝ inch below the top of inlet tube 34.

The feed control unit F also includes a cover member G comprising a tray having a floor 38 and a rising cylindrical wall 39. The floor 38 has a downwardly protruding generally cylindrical hub 40 with two arcuate notches therein, the larger of which notches 41 is of diameter to embrace the inlet tube 34 and the smaller of which notches 42 is of diameter to embrace the discharge tube 35 when the cover member G is telescopically mounted upon the body member B. The floor 38 of the tray has an aperture or port 43 therethrough, desirably in the order of ½ inch in diameter, substantially coaxial in the assembled construction with the inlet tube 34. Water caught in the tray from the spray in the tower would ordinarily be at the level of the rim of the tray, the excess flowing over. From the tray water flows through the port 43 at rate determined by the diameter of said aperture, to enter the inlet tube 34. The rate of water flow through port 43 is determined by the effective diameter of that aperture which in turn depends on the inner diameter or bore of a brass bushing 44 snugly fitting into the aperture 43. In practice there would be a supply of calibrated bushings, one of which would be selected in accordance with the flow requirements.

In order to avoid excess impact of flowing water upon the chemical in the container C and therefore entrainment of chemical at excessive rate, with consequent overtreatment and waste, the inlet tube 34 is preferably provided with a baffle 45 near its top extending diametrically thereacross. That baffle is desirably of width approximately ⅜ inch and may have a median notch 46 transversely across its top, illustratively ⅜ inch wide. The baffle assures the spread of the relatively thin stream of water passing through the inlet port or bushing 44, so as to fill the entire bore of the one inch inlet pipe immediately below substantially the top of the baffle, so that the linear speed of the water thus filling the inlet tube and entering the container is materially lower than that through bushing 44. That reduced speed is desirably in the order of but 0.15 foot per second. Accordingly the water will impinge upon the surface of the chemical with but little impact, so that the chemical is dissolved but slowly, and by reason of the small difference in head of the water in the inlet tube 34 (which is filled up to approximately the upper surface of the baffle 45) and the top of the discharge tube 35 (a difference of head, desirably about ¼ inch), the water will flow from the inlet tube 34 across the top of the chemical D through the discharge tube 35 to the basin 10 of the spray chamber, for appropriate chemical treatment of the water in the system.

In order to avoid air binding of the thin stream of water through the bushing 44, a cavity 47 is formed in the under face of the cover piece adjacent the bushing 44, which affords ready venting of air by opening to the outside above the rim of tube 34 from which the base of the cavity 47 is spaced at the overhanging circumference of cover member G. The lower end of the rim of the cover piece is undercut or beveled as at 47' from its outer rim inwardly as shown, to lead overflow of water away from the cavity or undercut 47 and thus avoid feed of water to tube 34 in excess of that which is fed from bushing 44.

The floor 38 of cover unit G may be molded with a plurality, illustratively three, upstanding fins or baffles 49 radiating desirably at equal angular intervals from the port 43. These fins are effective to check any vortex of the water in the cover tray which might reduce the rate of feed below that desired, through the aperture or bushing 44.

In the absence of other precautions, spray of water from the spray tower might be pointed through the port or bushing 44 resulting in increased impingement upon the chemical with consequent excess of chemical feed. Also there might be a jetting action of such spray upon the water in the tray, thus depressing the level of water therein and causing decelerated delivery through the aperture 44 into the container of chemical. To avoid such disturbances, a foraminated disk 48, desirably of brass, is affixed, desirably removably, upon the cover element G of the feed control unit F, at level well above the rim of the wall 39 of the tray, such foraminated disk to spread the water of the spray jets and to allow it to be distributed through many of its foraminations.

In order to mount such foraminated disk, the cover piece G is desirably constructed as follows:

Preferably the rim of the tray wall 39 of the cover piece G is provided with rests integral with the cover piece which may be in the form of ribs 50 rising along the inside of the tray wall above its rim. Illustratively, three of such stops are provided at equal angular intervals. For security of construction, the wall 39 of the tray extends upwardly beyond its water level determining rim across the width and height of two of the stops 50' and 50², as well as along the intervening arc as at 51. The third stop 50³ is similarly reinforced by a rib extending well thereabove and laterally thereof and desirably affording a protruding thickness on the outer face of the rim as at 52.

Desirably lips 53 are formed unitary respectively with the reinforce arc 51 immediately above two of the stops 50' and 50² and on the reinforce rib 52 immediately above stop 50³. Thus lips 53 are spaced but slightly from the tops of the corresponding ribs to permit the periphery of the foraminated disk 48 to be snapped in place between the respective stops 50 and their associated lips 53.

The reinforce 52 serves an additional function. In some situations the water spray in the tower may be of density inadequate to maintain the tray of the cover G filled to its effective rim. To supply additional water in such case, an auxiliary supply conduit 54 may be led from the circulating water line for its outlet extremity 55 to be lodged in a corresponding notch 56 formed in the upper end of the reinforce 52.

While in general it is preferred to form the feed control unit of two molded pieces B and G, as shown, a body piece B and a cover piece G telescoped thereover, as described, it is of course understood that the two pieces might be combined in a single integral construction.

Since the water in the re-circulating system is not intended for drinking purposes or even for ablutions, the inclusion of ingredients that would be toxic even in the small proportions used is not objectionable for present purposes.

It is desirable, according to the present invention, to use as the chemical in the feeder, sodium dichromate ($Na_2Cr_2O_7 \cdot 2H_2O$) and caustic soda (NaOH) in combination. One pound of the dichromate when mixed with 0.27 pound of caustic soda, gives 1.09 pounds of neutral sodium chromate ($Na_2CrO_4$) that serves to form and maintain the desired corrosion resistant film on the walls of the installation. However, for the desired alkaline reaction, there is used in addition an excess of caustic soda. That excess may be as much or as little as is required for any particular installation. In actual practice, under operating conditions, approximately 2 parts by weight of the sodium dichromate to 3 parts of the caustic soda was found to be most useful. While the component chemicals may be used in aqueous solution, it is preferred to combine them for use as a solid molded chemical. The excess of caustic soda used, regardless of its amount, becomes incorporated in the molded chemical that results from the chemical reaction between the combining proportions above set forth of crystalline sodium dichromate and caustic soda when mixed in the absence of free water. The mixture of chemicals in that form, when introduced into the container C to the desired level, preferably to within approximately one inch of the top must be well mixed mechanically in order to cause the desired reaction, with the evolution of heat. Upon several hours of cooling, the chemical will solidify, molded to the walls of the container C. The chemical thus molded within the container C affords a unit which is light in weight and easy to manipulate, since it is devoid of free water. The container may desirably be provided with a handle $h$, desirably on its top 32. Thus for servicing the installation, the spent portable unit is simply removed from the spray chamber, or generally from its carrying frame 28, and replaced by a fresh unit that is simply rested in the basin 10 or in the frame 28 which supports it in the basin.

The molded chemical prepared as set forth will, when used in the system and in the manner described, provide a concentration of sodium chromate ($Na_2CrO_4$) in the usual re-circulating system, of 200 to 700 parts per million, which serves to form and maintain a protective film on the metal with which the circulating water comes into contact to protect the same both against chemical and galvanic attack. With the concentration of chemical noted, sufficient caustic soda is dissolved in the re-circulating water to maintain the pH of such water in the range of from 7.0 to 8.5 which are the desirable operating limits for protecting submerged or exposed metal surfaces from corrosive attack by the water in air conditioning systems.

A chemical feeder charged with molded chemical made of 3 pounds, 2 ounces of crystalline sodium dichromate and 4 pounds, 12 ounces of caustic soda will afford the needed chemical for 1,500 gallons of water lost through windage, leakage and drainage, in order to afford corrosion control of an air conditioning system that loses that amount of water per week and so needs be serviced with a fresh container of chemical but once a week, and a smaller air conditioning system need be serviced correspondingly less frequently with the use of that size of chemical container. A larger air conditioning system may be treated with two or more of the chemical containers C, each with its feed control unit F accommodated thereon.

An alternative molded chemical for corrosion control utilizes anhydrous sodium chromate instead of the crystalline sodium dichromate. A typical combination would be 4 pounds, 10 ounces of anhydrous sodium chromate with 3 pounds, 2 ounces of caustic soda.

The components of anhydrous chromate and caustic soda are mechanically mixed together, to yield a mixture which will not react until water is added. The appropriate quantity of the mixture according to this embodiment, is introduced into the container C in the amount above stated, to which is thereupon added 1 pound, 4 ounces of water, which causes the reaction to take place to form the molded solid. Thus the alternative formula set forth in this paragraph has one substantial advantage over the first mentioned or sodium dichromate formula in that the dichromate formula may not be pre-mixed (since pre-mixture might cause reaction and solidification), but the components must be poured into the container from separate vessels and the contents must then be well mixed mechanically to cause the solidification or molding.

The chromate, as contradistinguished from the dichromate, admits of pre-mixing with caustic soda, as above set forth, and convenient introduction of the mixture into the container without the need for further agitation, the solidification or molding operation occurring only upon the addition of water as above set forth.

Another alternative chemical which may be used for corrosion control instead of either the sodium dichromate or the sodium chromate composition, is sodium nitrite. Unlike the chromates, which may sometimes be esthetically objectionable because of their yellow color, the sodium nitrite is a colorless chemical. A typical sodium nitrite combination would be 7 pounds, 2 ounces of sodium nitrite, plus 1 pound, 14 ounces of caustic soda. Upon introducing the mixture into the container, the addition of 1 pound of water causes solidification to a molded solid in the same way as in the case of the sodium chromate, caustic soda combination.

In the use of the feed control apparatus described for the purpose solely of checking the formation of scale, hexametaphosphates could be used to advantage in place of the anti-corrosion chemical above described.

In the same apparatus, any of various algicides and slimicides accommodated in container C, could alternatively be delivered to the system in the same manner as the chemical for scale prevention. Among suitable algicides and slimicides are calcium hypochlorite, sodium pentachlorophenate, a mixture of sodium dimethyldithiocarbamate and sodium 2-mercaptobenzthiazole, copper sulphate, alkylbenzyltrimethylammonium chlorides, phenyl mercuric acetate, sodium 2,4,5 trichlorophenate and polycyclic quinones.

The chemical for inhibiting corrosion, the chemical for minimizing scale and the algicide or slimicide may be used concurrently in the same container C (unless chemically incompatible) for delivery together at desired rate by the feed control unit. Alternatively the scale control or the algicide or slimicide may be incorporated in the corrosion control mixture in the container C in suitable proportions to effect the combined action of the chemical for inhibiting corrosion with one or the other of the chemicals for minimum scale or algae or slime.

Where the scale control chemical or the algicide or slimicide, or both, are incorporated with the corrosion checking chemical, the solidification or molding of the mixture in the container will occur exactly as above described with respect to the corrosion control chemical when used alone.

Where either the scale control chemical or the algicide or slimicide are used alone, or conjointly in the container C without corrosion control, the chemical in the container may not become solidified, but its feed will be effected reliably by way of the feed control B, G.

The chemical feeder delivers the chemical in solution in all cases, whether the chemical in the container C is originally in solid molded form, powdered or crystalline or liquid.

While the mode of operation will probably be generally understood from the foregoing description, that operation will now be more fully set forth to assure compliance with the statutory requirements.

The body piece B of the feed control unit, preferably of rubber, is screwed upon the neck 33' of the container C of chemical in place of the usual cap (not shown) which is discarded, and is surmounted by the cover piece G with its foraminated disk 48 in place thereon as described.

In use of the air conditioner system, spray splashing upon the foraminated disk 48 will maintain the tray of the cover piece G filled substantially to the effective rim of its wall 39. Water under the head determined by that rim will flow downwardly through the port 43 or the bore of its bushing 44 to impinge upon the upper surface of the notch 46 in the baffle 45 by which the water is caused to spread substantially to fill the inlet tube 34 up to substantially the top of baffle plate 45 and to fill the space in the container C between the chemical D therein and its top wall. The linear rate of flow of water through the inlet tube 34 would be at slow rate which may be in the order of 0.15 feet per second which would not cause any excessive impact against the chemical in container C, so that the rate at which chemical can be picked up in the discharge of water through the top of the outlet tube 35 to the basin 10 in the cooling water system is determined by the head, desirably in the order of about ¼ inch between substantially the upper face of baffle 45 and the top of the discharge tube 35. The chemical feed thus occurs only while the air conditioner system is operating and at rate proportioned to the flow of water through container C. That rate may be readily calibrated by selection of bushing 44 of appropriate bore to maintain the water in the circulating system at the required chemical composition and pH, to check corrosion of the metal parts and avoid clogging of the nozzles or outlets by accumulated entrained corrosion product, or to check scale or to check slime, or conjointly to check any two or all three of these difficulties. In general chemical is to be fed from each container C at the rate of from 2.5 to 80 grams per hour, while the air conditioning system is operating.

The container of chemical, desirably 4 to 5 inches high, affords an impinging distance of the stream that moves slowly through inlet tube 34, such that whether the container is freshly placed in service, or the contents practically exhausted, the impinging distance of the slow moving stream through inlet tube 34 is such that the chemical pick-up rate is at all times within the range required to maintain the treated water between the desired limits of concentration of added chemical.

Only in such cases in which the spray density over the tray of the cover piece G is inadequate to maintain water in the tray clear to its effective rim, would the auxiliary supply 54 be tapped into the circulating water line and its outlet frictionally placed in the notch 56 of the reinforce 52 to supplement the water supply to the cover piece G.

In air conditioning water re-circulating systems, some chemical is lost with the water that leaks through the glands in the pumps and with the water that is blown out of the tower by windage. Such loss per se does not affect the concentration of chemical or pH of the remaining water in the system. However, when this loss is automatically replaced by the addition of fresh feed or tap water, the concentration of dissolved solids in the circulating water will decrease. Of prime importance, however, is the water lost by evaporation with consequent progressive increase of concentration of the mineral matter remaining dissolved in the water. If the concentration thus becomes excessive, scale will precipitate and this becomes particularly objectionable since it may cause clogging of nozzles or outlets in the spray heads, and cause the scaling of the refrigerant condenser tubes, entailing a serious drop in heat transfer efficiency.

In some systems, so much water is lost through windage that the concentration of dissolved solids in the circulating water does not become excessive. In many other systems, however, bleed-off of some of the concentrated water is required and its replacement with fresh water from the make-up pipe 13 in order to bring down the concentration of dissolved mineral solids sufficiently to avoid objectionable formation of scale.

To this end, according to one embodiment of the invention shown in Fig. 6, a cover piece element G' such as element G of the feed control unit of Figs. 3, 4 and 5, may be employed for such bleed-off purpose. To this end such cover piece G' seats in a cup 70 of like material which has sockets 71, for wire legs 72 supported at their lower ends in ring 73. Cup 70 drains through a rubber hose 63, the lower end of which is introduced into the upper end of the overflow pipe 11 from the basin 10. Under the same conditions and for the same purpose as set forth in the description of Fig. 2, and shown at 54, a supply tube 64 may be connected, as shown in Figs. 6 and 7, at its upper end to the spray header line 18, the outlet 64' being mounted in the notch 65 of reinforce 66 in the cover piece G'. Valve 67 near the upper end of the supply pipe 64 controls the supply of such water to the bleed-off unit 60. The bushing 44 under the head determining by tray wall 39 controls the bleed-off rate required to prevent scale formation. In a typical case of a cooling tower, the bleed-off rate might be equivalent to a quarter of a gallon to one gallon per minute.

It is of course understood that the bleeder system just described could be used independently of the equipment shown in Figs. 1 to 5 for bleeding circulating water from an air conditioning system to prevent excessive concentration of dissolved solids, regardless what means be used to supply chemical to the system.

Fig. 8 shows a modification to assure adequate water to the tray of the cover G even where the water spray in the tower is not of adequate density for the purpose. To this end a simple tray adapter A which may be and preferably is of plastic or rubber but could be made of sheet metal, is removably and frictionally retained in the rising cylindrical wall 39 of the tray of cover member G. To this end the catch basin adapter has a cylindrical skirt 75 thus frictionally retained, protruding from the shallow funnel 76 that extends outward therefrom and thus will intercept several times the amount of water, illustratively four times the amount that the tray would intercept when used without the tray adapter. For this purpose, the lower rim of the cylindrical skirt of the adapter is notched as at 77 so that any excess of water collected by the adapter will escape through said notches and the desired level of water to the rim of cylindrical wall 39 of the tray of cover member G is maintained to assure the desired head under the conditions mentioned.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. For an air conditioning system, a portable chemical feeder unit comprising a rate-of-flow control means including a liquid collecting tray at the upper part of the feeder unit and a flow control aperture therefrom for predetermining the flow rate therethrough, said unit also including an impingement control and discharge system comprising an inlet tube spaced from and directly below said control aperture and also including an outlet tube, the discharge end of which is below the upper end of the inlet tube, both said inlet and said outlet tube being of bore diameter much larger than that of the flow control aperture, whereby a head of liquid maintained in the tray flows at rate predetermined by the control aperture into the inlet tube at linear rate of flow greatly reduced relative to that through the flow control aperture, for controlled impingement upon chemical in a container upon which the chemical feeder unit may be mounted, and liquid with entrained chemical is channelled by the discharge system determined by the inlet and the outlet tube for delivery from the chemical feeder.

2. The combination recited in claim 1 in which the feeder unit comprises two elements in mutually telescoped relation, including a body piece having the inlet tube integral therewith, rising therefrom and communicating at its lower end with the chemical in the container, the discharge tube rising from said body piece and integral therewith, to deliver water from the container with chemical dissolved therein, the body piece having telescoped thereon a cover piece having a hub encompassing parts of the body piece, the cover piece comprising the tray determining the head of water to the inlet tube.

3. The combination recited in claim 1 in which the tray has a plurality of supports unitary therewith at its periphery and a foraminated plate rests upon said supports above the effective rim of the tray and serves to interrupt flow of a direct stream to the port in said tray or excessive agitation due to impact of water dropping in use upon the water collected in the tray.

4. The combination recited in claim 1 in which the floor of the tray has baffles rising therefrom and radiating from the port to check the formation of a vortex that might tend to underfeed water to the port.

5. The combination recited in claim 1, in which a tray adapter is removably lodged within and against the wall of the tray of the feeder unit, said adapter having a funnel extending above the feeder unit for intercepting several times the amount of water spray that the tray would intercept in its absence, said adapter having a cylindrical skirt portion removably telescoped with respect to the wall of the tray, the lower rim of said skirt having a plurality of notches for escape therethrough of water in excess of that to maintain the desired level up to the rim of the tray wall.

6. In a portable chemical feeder unit for an air conditioning system, a body piece suitable for application to a chemical container, said body piece having an inlet tube integral therewith, rising therefrom, of bore in the order of one inch and of effective length materially greater than said bore, said inlet tube having a baffle diametrically thereacross near the upper end thereof, of width considerably less than one-half the diameter of the bore, said body piece having a discharge tube rising therefrom, both said inlet and said discharge tubes being open at their top and bottom ends, a cover piece having a hub at its bottom with two cut-outs, one extending about the inlet tube and the other about the outlet tube and removably telescoped thereover, said cover piece having a tray unitary therewith, the bottom of said tray having a port therethrough substantially directly above the baffle in said inlet tube.

7. A container charged with solid chemical to be fed at predetermined rate as required into circulating water, said container having a threaded mouth, a feed controlling unit comprising a body piece having a threaded cap for application to said threaded mouth, an inlet tube unitary with said body piece and rising from said cap, a discharge tube laterally of said inlet tube unitary with said cap and rising therefrom, a cover unit comprising a circular tray and a hub under said tray, in telescoping relation to said body piece, said tray having a port of predetermined diameter therethrough aligned with the axis of, substantially above and much smaller in diameter than the bore of said inlet tube.

8. In a portable chemical feeder unit, a body piece having an upstanding inlet tube and an upstanding outlet tube, a body piece removably mounted upon said piece and having a cover tray, a port therethrough registering with and spaced from the inlet tube for feeding water thereinto, a cavity in the bottom of said tray for venting of air past the top of the inlet tube, said tray having an inwardly beveled lower rim to lead overflow of water away from the cavity and thus to avoid over-feed of water to the inlet tube.

References Cited in the file of this patent

UNITED STATES PATENTS

| 1,604,126 | Kern | Oct. 26, 1926 |
| 1,777,152 | Poteet | Sept. 30, 1930 |
| 1,904,157 | Martin | Apr. 18, 1933 |
| 1,941,125 | Barsky | Dec. 26, 1933 |
| 2,008,651 | Zinn | July 16, 1935 |
| 2,104,986 | Haagenson | Jan. 11, 1938 |
| 2,219,416 | French | Oct. 29, 1940 |
| 2,521,804 | Otto | Sept. 12, 1950 |
| 2,577,054 | Waterman | Dec. 4, 1951 |
| 2,610,148 | Lundy | Sept. 9, 1952 |
| 2,700,651 | Tepas et al. | Jan. 25, 1955 |
| 2,709,522 | Osborne | May 31, 1955 |
| 2,711,391 | Kahler | June 21, 1955 |

OTHER REFERENCES

"Servel 'Corrosion-Master' Evaporative Water Coolers" (4 page brochure No. OAC–88–08), copyright 1950, page 2 relied on.